US012801195B2

(12) United States Patent
Chou et al.

(10) Patent No.: US 12,801,195 B2
(45) Date of Patent: Nov. 17, 2026

(54) HIERARCHY BASED THERMAL DESIGN POWER MANAGEMENT METHOD, MODULE, AND ELECTRONIC DEVICE USING THE SAME

(71) Applicant: FLYTECH TECHNOLOGY CO., LTD., Taipei City (TW)

(72) Inventors: Li-Chun Chou, Taipei City (TW); Shui-Chin Tsai, Taipei City (TW)

(73) Assignee: FLYTECH TECHNOLOGY CO., LTD., Taipei City (TW)

( * ) Notice: Subject to any disclaimer, the term of this patent is extended or adjusted under 35 U.S.C. 154(b) by 80 days.

(21) Appl. No.: 18/982,489

(22) Filed: Dec. 16, 2024

(65) Prior Publication Data

US 2026/0161206 A1 Jun. 11, 2026

(30) Foreign Application Priority Data

Dec. 11, 2024 (TW) ................................ 113148240

(51) Int. Cl.
*G06F 1/20* (2006.01)
*G06F 11/30* (2006.01)

(52) U.S. Cl.
CPC .......... *G06F 1/206* (2013.01); *G06F 11/3058* (2013.01)

(58) Field of Classification Search
CPC ............................ G06F 11/3058; G06F 1/206
See application file for complete search history.

(56) References Cited

U.S. PATENT DOCUMENTS

| | | | | |
|---|---|---|---|---|
| 10,509,449 | B2 * | 12/2019 | Nguyen | G06F 1/324 |
| 2016/0147280 | A1 * | 5/2016 | Thomas | G06F 1/206<br>713/320 |
| 2019/0011963 | A1 * | 1/2019 | Nguyen | G06F 1/3243 |
| 2023/0037377 | A1 * | 2/2023 | Fresa | G06F 1/3234 |

* cited by examiner

*Primary Examiner* — Jaweed A Abbaszadeh
(74) *Attorney, Agent, or Firm* — Demian K. Jackaon; Jackeon IPG PLLC

(57) ABSTRACT

The present invention relates to a hierarchy based thermal design power management method. The method includes: through a BIOS firmware: providing for a user to customize a plurality of temperature levels including a current temperature level defined by an interval temperature upper limit and an interval temperature lower limit; through an embedded controller: periodically reading an operating temperature for a processor; assigning a higher temperature level as the current temperature level, if the operating temperature is greater than the interval temperature upper limit; and assigning a lower temperature level as the current temperature level, if the operating temperature is less than the interval temperature lower limit.

7 Claims, 6 Drawing Sheets

| Temperature levels (Event names) | Temperature upper limit | Temperature lower limit | TDP limit |
|---|---|---|---|
| First temp. level L1 (0xL1) | 73.000 | 71.000 | 10 |
| Second temp. level L2 (0xL2) | 75.000 | 73.000 | 9 |
| Third temp. level L3 (0xL3) | 77.000 | 75.000 | 8 |
| Fourth temp. level L4 (0xL4) | 79.000 | 77.000 | 7 |
| Fifth temp. level L5 (0xL5) | 81.000 | 79.000 | 6 |
| Sixth temp. level L6 (0xL6) | 83.000 | 81.000 | 5 |
| Seventh temp. level L7 (0xL7) | 85.000 | 83.000 | 4 |
| Eighth temp. level L8 (0xL8) | OT>90.000+10.000 | | 3 |

HIERARCHY BASED THERMAL DESIGN POWER MANAGEMENT METHOD, MODULE, AND ELECTRONIC DEVICE USING THE SAME

CROSS-REFERENCE TO RELATED APPLICATION

This application claims priority benefit to Taiwan Invention Patent Application Serial No. 113148240, filed on Dec. 11, 2024, in Taiwan Intellectual Property Office, the entire disclosures of which are incorporated by reference herein.

FIELD

The present invention relates to a hierarchy based thermal design power management method, a module, and an electronic device using the same, in particular to a hierarchy based thermal design power management method, a module, and an electronic device using the same, wherein the electronic device determines the corresponding temperature level based on stochastic variations in the operating temperature for a processor to decide the appropriate thermal design power.

BACKGROUND

In modern life, various electronic devices, such as desktop computers, servers, laptops, and point-of-sale (POS) machines, require electrical power to drive electronic components therein to operate. During operation period, the electronic components within these devices need to receive voltage (V) and current (I) to keep their components functioning, and the energy consumed by these components is referred to as power consumption (W).

However, during operation, all hardware components in these devices consume energy, which is converted into heat and dissipated. If the dissipated heat is not properly managed, it may have brought different degrees of negative impact on the operational efficiency and lifespan for these devices.

For example, in commonly available desktop or laptop computers, a typical thermal management method involves predefining a "temperature wall" or maximum temperature limit within the processor. This represents the highest temperature that the processor can tolerate. When the processor temperature reaches this limit, the system automatically activates a throttling mechanism that significantly reduces power consumption to control the temperature rise and prevent hardware damage.

For instance, when the processor temperature reaches the temperature wall, the processor may drastically limit its power output, such as dropping from 12 W to 6 W or lower. While this approach can quickly reduce temperatures, the sudden decrease in power may cause delays or stuttering during operations, significantly reducing system performance and negatively impacting user experience.

On the other hand, the value of the temperature wall is preset and cannot be dynamically adjusted during operation based on the actual thermal conditions of the processor. This lack of a balancing mechanism between cooling and performance compromises thermal management. In particular, modern desktop and laptop computers, which must maintain compact form factors while ensuring high performance, require a balance between power consumption and thermal management.

Hence, there is a need to solve the above deficiencies/issues.

SUMMARY

The present invention relates to a hierarchy based thermal design power management method, a module, and an electronic device using the same, in particular to a hierarchy based thermal design power management method, a module, and an electronic device using the same, wherein the electronic device determines the corresponding temperature level based on stochastic variations in the operating temperature for a processor to decide the appropriate thermal design power.

Accordingly, the present invention provides a hierarchy based thermal design power management method. The method includes: through a BIOS firmware: providing for a user to customize a plurality of temperature levels including a current temperature level defined by an interval temperature upper limit and an interval temperature lower limit; through an embedded controller: periodically reading an operating temperature for a processor; assigning a higher temperature level as the current temperature level, if the operating temperature is greater than the interval temperature upper limit; and assigning a lower temperature level as the current temperature level, if the operating temperature is less than the interval temperature lower limit.

The present invention further provides a hierarchy based thermal design power management module. The module includes: a processor including a temperature sensor and a model-specific register; a BIOS firmware configured to provide for a user to customize a plurality of temperature levels including a current temperature level defined by an interval temperature upper limit and an interval temperature lower limit; and an embedded controller configured to: periodically read an operating temperature sensed by the temperature sensor; override the current temperature level with a higher temperature level, if the operating temperature is greater than the interval temperature upper limit; and override the current temperature level with a lower temperature level, if the operating temperature is less than the interval temperature lower limit.

The present invention further provides an electronic device. The device includes: a processor including a temperature sensor and a model-specific register; a BIOS firmware configured to provide for a user to customize a plurality of temperature levels including a current temperature level defined by an interval temperature upper limit and an interval temperature lower limit; and an embedded controller configured to: periodically read an operating temperature sensed by the temperature sensor; override the current temperature level with a higher temperature level, if the operating temperature is greater than the interval temperature upper limit; and override the current temperature level with a lower temperature level, if the operating temperature is less than the interval temperature lower limit.

The above content described in the summary is intended to provide a simplified summary for the presently disclosed invention, so that readers are able to have an initial and basic understanding to the presently disclosed invention. The above content is not aimed to reveal or disclose a comprehensive and detailed description for the present invention, and is never intended to indicate essential elements in various embodiments in the present invention, or define the scope or coverage in the present invention.

DESCRIPTION OF THE DRAWINGS

A more complete appreciation according to the present invention and many of the attendant advantages thereof are readily obtained as the same become better understood by reference to the following detailed description when considered in connection with the accompanying drawing, wherein.

DETAILED DESCRIPTION

Figure 1:
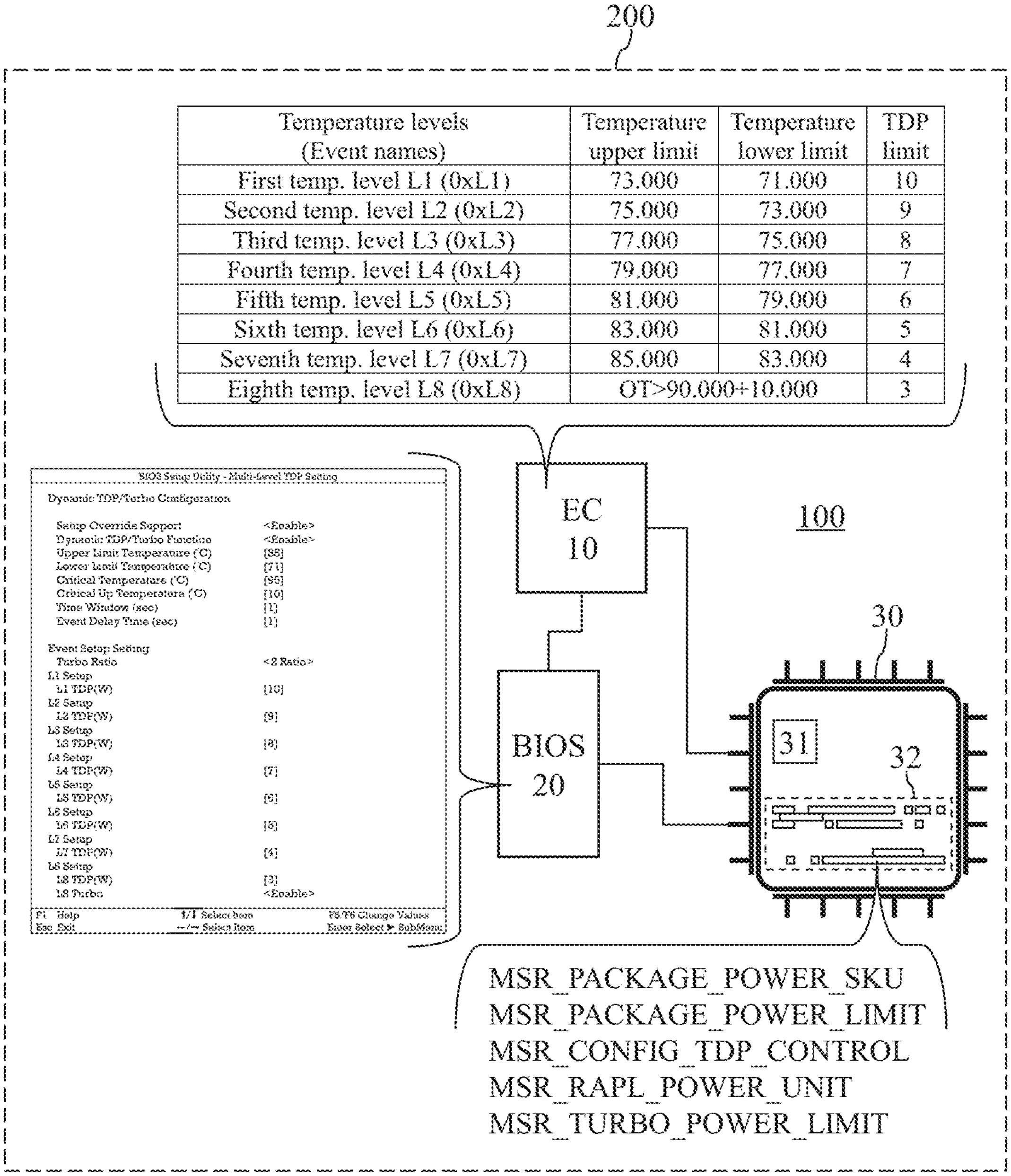
FIG. 1 is a schematic diagram illustrating the hardware architecture for the hierarchy based thermal design power management module included in the present invention.

The present disclosure will be described with respect to particular embodiments and with reference to certain drawings, but the disclosure is not limited thereto but is only limited by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice. It is clear that other embodiments can be configured according to the knowledge of persons skilled in the art without departing from the true technical teaching of the present disclosure, the claimed disclosure being limited only by the terms of the appended claims.

It is to be noticed that the term "including," used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device including means A and B" should not be limited to devices consisting only of components A and B.

The present invention relates to high performance computing systems, in particular to a hierarchy based thermal design power management method, a module, and an electronic device implementing the method and using the module. The present invention is capable of dynamically adjusting the TDP according to the stochastic variations in the operating temperature for a processor to achieve a balance between thermal management and performance efficiency.

FIG. 1 is a schematic diagram illustrating the hardware architecture for the hierarchy based thermal design power management module included in the present invention. The hierarchy based thermal design power management method according to the present invention is preferably implemented in the form of firmware code that is attached to the hierarchy based thermal design power management module 100 for implementation. The hierarchy based thermal design power management module 100 is preferably a part of the electronic device 200 or included in the electronic device 200. The hierarchy based thermal design power management module 100 includes an embedded controller (EC) 10, a basic input/output system (BIOS) firmware 20, and a processor 30.

Electronic device 200 is preferably any type of electronic processing equipment with computing capabilities, which includes but is not limited to: point-of-service (POS) devices, point-of-sale (POS) devices, self-checkout (SCO) systems, personal computers (PCs), laptops, touchscreen computers (PPCs), multimedia kiosks, embedded computers (Box PCs), industrial computers, medical computers, medical workstations, ticket vending machines, vending machines, automated teller machines (ATMs), servers, tablets, tablet devices, workstations, and any electronic processing device with limited heat dissipation capacity.

The processor 30 integrates at least a temperature sensor 31 and a model-specific register (MSR) 32 therein. The temperature sensor 31 is configured to sense the operating temperature of the processor 30 in real time. The model-specific register 32 is preferably a register block within the processor 30 configured to store data and parameters related to the thermal design power, the TDP. By modifying or overriding the value of the TDP stored in the model-specific register 32, it is capable of dynamically adjusting the TDP for the processor 30 in real time.

The BIOS firmware 20 is preferably an embedded firmware unit responsible for hardware initialization and basic configuration during the system boot process. In one embodiment, the BIOS firmware 20 is configured to allow a user to customize TDP settings. Preferably, a multi-level thermal design power setting page is designed to be added and attached to the original manufacturer's BIOS setting utility interface, which provides for the user to customize various parameters and values necessary for executing the hierarchy based thermal design power management method according to the present invention during the boot process. Based on the user-customized data, a multi-level temperature thermal design power mapping table is created and stored in the memory of the embedded controller 10 for reading by the embedded controller 10. The BIOS firmware 20 stores only a simplified temperature event structured table.

The embedded controller 10 is preferably a microcontroller (MCU) dedicated to performing low-level hardware management tasks in embedded devices. In one embodiment, the embedded controller 10 is configured to read and monitor the operating temperature of the processor 30 from the temperature sensor 31 at the start or end of each time window and perform logical judgements based on the multi-level temperature thermal design power mapping table to determine whether the operating temperature exceeds the interval temperature upper limit or the interval temperature lower limit of the current temperature level. The time window has a time length that is is preferably, but not limited to, 0.5 seconds, 1 second, 2 seconds, 3 seconds, or 4 seconds.

The multi-level temperature thermal design power mapping table is written into the embedded controller 10 by the BIOS firmware 20.

The hierarchy based thermal design power management method according to the present invention is configured to actively pre-reduce the TDP limit for the processor, by a level-by-level way, before the operating temperature detected by the temperature sensor 31 approaches the pre-defined temperature wall, thereby preventing the processor from overheating. In contrast, when the operating temperature is appropriate or relatively low, the TDP limit of the processor 30 is increased, by the level-by-level way, also known as the stepwise way, to improve system performance.

The present invention is configured to either hierarchically decrease or increase the TDP in response to stochastic changes in the operating temperature of the processor 30, to dynamically switch the TDP to an appropriate configuration. The hierarchy based thermal design power management method according to the present invention preferably includes four control modes: a general control mode, a critical control mode, a turbo control mode, and an advanced control mode.

In the general control mode, the temperature range is defined by an temperature upper limit and a temperature lower limit and is divided into n temperature levels. Each temperature level corresponds to a particular interval temperature and a TDP value. The first temperature level preferably has the relatively lowest temperature and corresponds to the relatively highest TDP value, while the n-th temperature level preferably has the relatively highest temperature and corresponds to the relatively lowest TDP value.

For example, it is assumed that the operating temperature falls within the third temperature level, and then the third temperature level is assigned as the current temperature level. At that time, the second temperature level, which has a relatively higher corresponding TDP value and a relatively lower interval temperature locally, is assigned as a lower temperature level with respect to the third temperature level, as well as the fourth temperature level, which has a relatively lower corresponding TDP value and a relatively higher interval temperature locally, is assigned as a higher temperature level with respect to the third temperature level.

The embedded controller 10 is configured to read the operating temperature of the processor 30, detected by the temperature sensor 31, at the start or the end of each time window. When the hierarchy based thermal design power management method is initially executed, that is, at the first time window along the time line, since the current temperature level is not yet assigned and is null, the embedded controller 10 is configured to perform an initialization process to define the current temperature level. According to the multi-level temperature thermal design power mapping table, the embedded controller 10 is configured to perform logical judgements to determine a particular temperature level within which the operating temperature falls and then assign the particular temperature level as the current temperature level.

Next, the embedded controller 10 is configured to transmit data associated with the current temperature level to the BIOS firmware 20 by a temperature event notification. The BIOS firmware 20 is configured to determine a corresponding TDP value according to the received data associated with the current temperature level, and to override the current TDP value stored in the model-specific register 32 with the corresponding TDP value.

After the initialization process is complete, the embedded controller 10 is configured to continuously read the operating temperature at the start or end of each time window, or alternatively, the embedded controller 10 is configured to the time use a time length of the time window as a monitoring period, and to periodically read the operating temperature accordingly, to perform logical judgements to determine whether the operating temperature exceeds the interval temperature upper limit or the interval temperature lower limit of the current temperature level. If the operating temperature exceeds the upper limit, the higher temperature level is assigned as the current temperature level. If the operating temperature falls below the lower limit, the lower temperature level is assigned as the current temperature level.

By continuously and cyclically performing in above manner, it is capable of dynamically configuring a TDP limit for a processor 30 in real time, via the ways of level-by-level reductions and level-by-level increases based on the operating temperature of the processor 30, thereby cooling down the processor 30 or increasing the performance of the processor 30, so as to achieve the engineering effect of optimizing a TDP configuration for a processor.

The general control mode is a fundamental universal mode that operates on an always-on basis whenever the electronic device 200 is in operation, in order to provide a better balanced management between heat dissipation and performance for the processor 30. It is preferably applicable to various scenarios, ranging from common daily tasks and multitasking situations, such as background system updates or downloads, to other complex operational tasks.

The critical control mode is established based upon the general control mode by additionally adding an n+1-th critical temperature level to the n temperature levels and setting a critical temperature and a critical up temperature. The critical temperature level is preferably a temperature level that has the absolute highest temperature and corresponds to a critical TDP value, which is preferably the absolute lowest TDP value globally.

At any time, if the embedded controller 10 determines that that the detected operating temperature exceeds the critical temperature, it is configured to further monitor whether the operating temperature reaches the critical up temperature after the time length of the next time window has elapsed. If both of the above conditions are fulfilled, the embedded controller 10 is configured to determine that the operating temperature is about to approach the limit of the temperature wall. At the point of time, the embedded controller 10 is configured to forcibly assign the critical temperature level as the current temperature level and to notify the BIOS firmware 20 to override the current TDP stored in the model-specific register 32 with the critical TDP, so as to immediately intervene and protect the processor 30 from overheating during a rapid rise in operating temperature.

The critical control mode is also considered to be a type of high-temperature protection mode, which is also a prioritized temperature level. As long as the operating temperature fulfills the above two conditions for entering the critical control mode at any time, the embedded controller 10 is configured to instruct the BIOS firmware 20 to prioritize entering the critical temperature level. The critical control mode is preferably applicable to various scenarios in which a user uses test software to perform long-duration testing to prevent system anomalies caused by long-lasting high temperatures due to unattended, unsupervised operation. The critical control mode is particularly suitable for heavy-load, long-duration, unattended, unsupervised scenarios.

Once implemented, the hierarchy based thermal design power management method according to the present invention is capable of effectively cooling down the processor 30 by immediately and automatically re-setting the TDP whenever the processor 30 is in an overheating situation, so as to provide an engineering effect of excellent thermal management and overheating protection for the processor 30. As a result of such optimized thermal management, the processor 30 is capable of operating in either a full-time turbo state or a temporary turbo state.

Based on the aforementioned thermal management, the present invention is designed to further add a turbo control mode to the general control mode and the critical control mode. The turbo control mode preferably offers two types of submodes including: an always-on turbo submode and a critical turbo submode, and allows users to customize the turbo ratio. Users are offered with options to select to enable either the always-on turbo submode or the critical turbo submode, and to set up the turbo ratio, which the turbo ratio is preferably set at 1, 1.5, or 2.

In the always-on turbo submode, during the entire runtime of the processor 30, which covers the runtime during the TDP configurations subject to the general control mode and the critical control mode, the processor 30 is configured to adjust its clock according to the user-customized turbo ratio to perform overclocking, to partially compensate for the limited performance of the processor 30 during the stepwise reduction process for the TDP.

In the critical turbo submode, the processor 30 is switched to the turbo mode only when a critical temperature event is triggered, to compensate for the performance loss resulted from the situation that the processor enters the lowest TDP configuration. At other times, the processor 30 does not enter the turbo mode.

The advanced control mode is added to the general control mode and the critical control mode. The advanced control mode is configured to allow the user to set an event delay time. When the event delay time is set to a non-zero value, which is a number of representing a specific period of time, the embedded controller 10 is configured to send the temperature event notification or the critical temperature event notification to the BIOS firmware 20 by delaying a duration of the specific period of time after a change in the current temperature level is detected, to defer the time at which the notification is sent to the BIOS firmware 20. When the event delay time is set to a zero value, the embedded controller 10 is configured to immediately send the temperature event notification or the critical temperature event notification to the BIOS firmware 20 when a change in the current temperature level is detected, without any delay.

The advanced control mode is configured to allow the duration of the current temperature level to be extended for an extended period of time, thereby reducing the response time or the feedback speed in response to the temperature increases or decreases and minimizing the frequency of switching TDP. The preferred use scenarios include software testing, image processing testing, or other tests that require lot of memory. In these scenarios, the demands for performance are prioritized over the thermal management. The option to enable the advanced control mode is provided in the BIOS interface.

In one embodiment, parameters including such as the number of temperature levels, the thermal design power corresponding to each temperature level, the temperature upper limit, the temperature lower limit, the critical temperature, the critical up temperature, the time window, the event delay time, the turbo ratio, and the enablement of turbo modes including the always-on and critical turbo submode are opened for users to define themselves. The present invention is designed to provide these parameters by newly adding a multi-level thermal design power setting page to the BIOS setting utility interface for user to customize.

Figure 2:
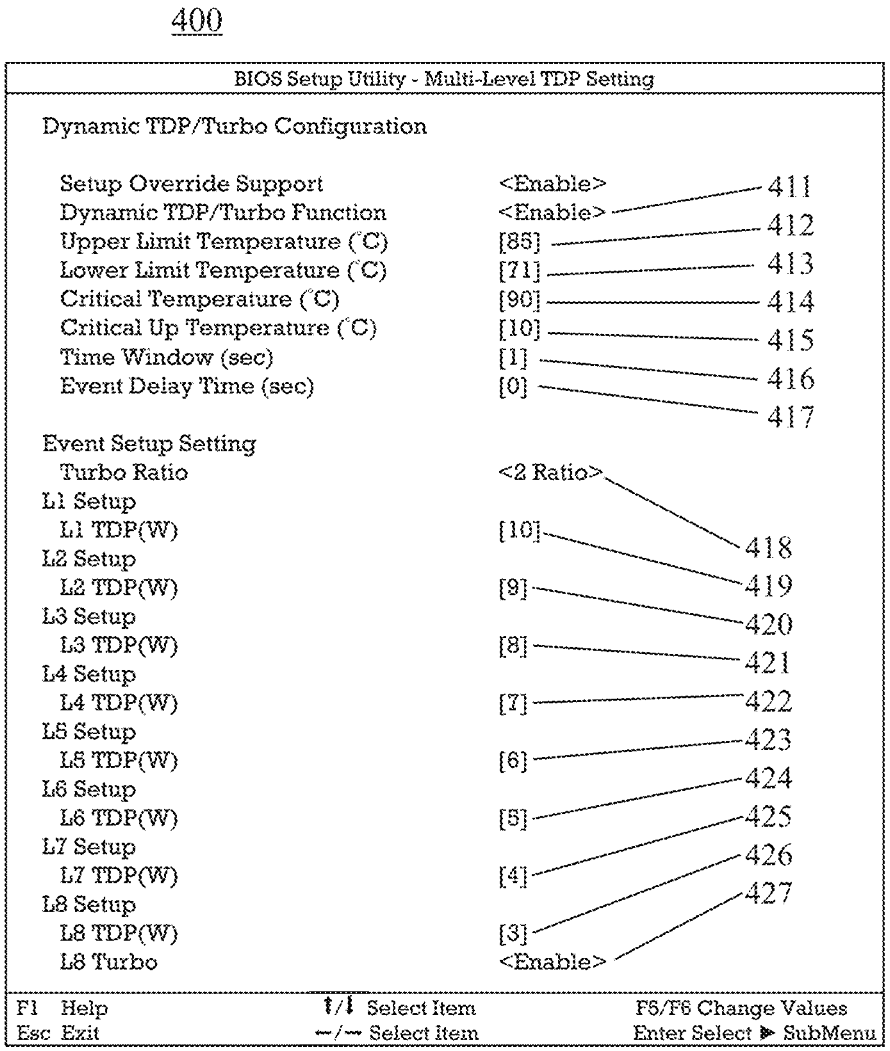
FIG. 2 is a schematic diagram illustrating the first embodiment and the multi-level thermal design power setting page included in the present invention.

FIG. 2 is a schematic diagram illustrating the first embodiment and the multi-level thermal design power setting page included in the present invention. In the first embodiment, a total of, but not limited to, 8 temperature levels, including, but not limited to, 7 temperature levels plus 1 critical temperature level, are provided for users to set parameters including, but not limited to, the temperature upper limit, temperature lower limit, and the TDP, etc. Accordingly, the displayed multi-level thermal design power setting page 400 is preferably as shown in FIG. 2.

The multi-level thermal design power setting page 400 is preferably configured to include fields including, but not limited to, the Dynamic TDP/Turbo Function field 411, the Temperature upper limit field 412, the Temperature lower limit field 413, the Critical Temperature field 414, the Critical Up Temperature field 415, the Time Window field 416, the Event Delay Time field 417, the Turbo Ratio field 418, the first temperature level L1 TDP (L1 TDP) field 419, the second temperature level L2 TDP (L2 TDP) field 420, the third temperature level L3 TDP (L3 TDP) field 421, the fourth temperature level L4 TDP (L4 TDP) field 422, the fifth temperature level L5 TDP (L5 TDP) field 423, the sixth temperature level L6 TDP (L6 TDP) field 424, the seventh temperature level L7 TDP (L7 TDP) field 425, the eighth temperature level L8 TDP (L8 TDP) field 426, and the eighth temperature level L8 Turbo mode enablement (L8 Turbo) field 427, wherein the eighth temperature level L8 represents the critical temperature level.

In the first embodiment, it is assumed that the default temperature wall for the processor is 105° C. and that there are a total of eight temperature levels. Accordingly, preferably, the temperature upper limit is set to 85° C., the temperature lower limit is set to 71° C., the critical temperature is set to 90° C., the critical up temperature is set to 10° C., the time window is set to 1 second, the event delay time is set to 0 seconds, the turbo ratio is set to 2, the values of the TDP for the first temperature level through the eighth temperature level are preferably set to 10 W, 9 W, 8 W, 7 W, 6 W, 5 W, 4 W, and 3 W, respectively. The Dynamic TDP/Turbo Function is preferably set to an enabled state.

After the user has customized the above data and parameters through the multi-level thermal design power setting page 400, the BIOS firmware 20 is configured to assign event names to each temperature level and to establish a multi-level temperature thermal design power mapping table based on the user-customized data as follows:

| Temperature levels (Event names) | Temperature upper limit | Temperature lower limit | TDP limit |
|---|---|---|---|
| First temp. level L1 (0xL1) | 73.000 | 71.000 | 10 |
| Second temp. level L2 (0xL2) | 75.000 | 73.000 | 9 |
| Third temp. level L3 (0xL3) | 77.000 | 75.000 | 8 |
| Fourth temp. level L4 (0xL4) | 79.000 | 77.000 | 7 |
| Fifth temp. level L5 (0xL5) | 81.000 | 79.000 | 6 |
| Sixth temp. level L6 (0xL6) | 83.000 | 81.000 | 5 |
| Seventh temp. level L7 (0xL7) | 85.000 | 83.000 | 4 |
| Eighth temp. level L8 (0xL8) | OT > 90.000 + 10.000 | | 3 |

Preferably, it is assumed that the current temperature level falls within the third temperature level L3, and the interval temperature for the third temperature level L3 is in an interval of 75.000-77.000° C. Since the interval temperature for the second temperature level L2 is in an interval of 73.000-75.000° C., which is lower than the interval temperature for the third temperature level L3, and the interval temperature for the fourth temperature level L4 is in an interval of 77.000-79.000° C., which is higher than the interval temperature for the third temperature level L3, the second temperature level L2 is assigned as a lower temperature level with respect to the third temperature level L3, and the fourth temperature level L4 is assigned as a higher temperature level with respect to the third temperature level L3.

Preferably, in these temperature levels, the TDP limit and the interval temperature are arranged to have the development trends in opposite to each other. For example, if the first temperature level L1 to the seventh temperature level L7 have the interval temperatures are arranged to develop in a level-by-level decreasing trend, the first temperature level L1 to the seventh temperature level L7 have the TDP limits are arranged to develop in a level-by-level increasing trend.

In the first embodiment, the BIOS firmware 20 is configured to write or store the multi-level temperature thermal design power mapping table into the memory block of the embedded controller 10. The BIOS firmware 20 is configured to simply retain only the event names and their corresponding TDPs locally and to correspondingly form and save n simplified temperature event structured tables. In the first embodiment, n=8; therefore, 8 temperature event tables are formed accordingly. For example, for the first temperature event, the first temperature event table preferably has contents as follows:

| Event Name | TDP |
|---|---|
| 0xL1 | 10 |

The embedded controller 10 is configured, after the boot process for the electronic device 200 is completed, to continuously and cyclically execute the hierarchy based thermal design power management method according to the present invention during the entire operating period of the electronic device 200, according to the user-defined data, parameters and configurations and the multi-level temperature thermal design power mapping table.

Figure 3:
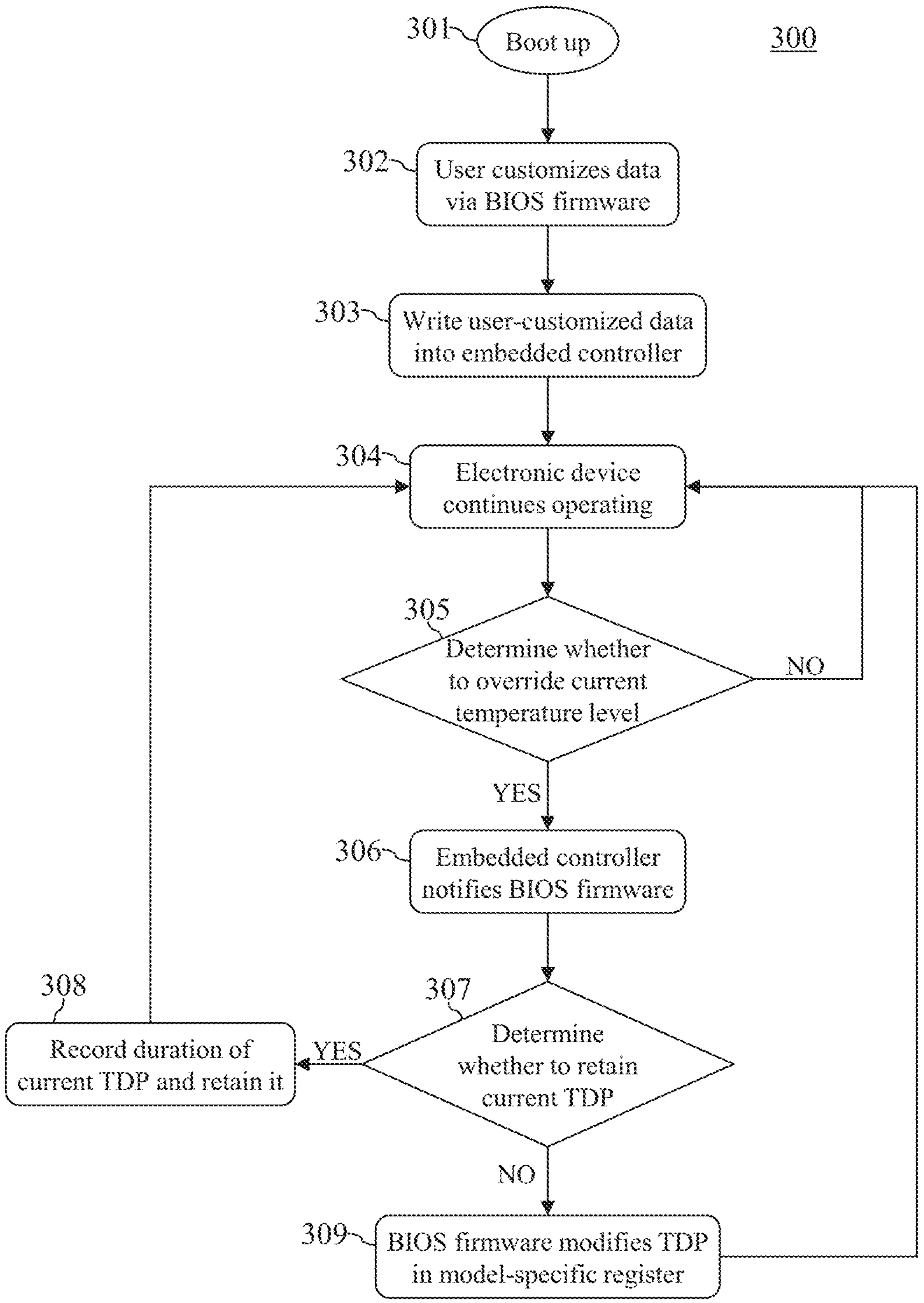
FIG. 3 is a flow chart showing the implementation steps of the hierarchy based thermal design power management method included in the present invention.

FIG. 3 is a flow chart showing the implementation steps of the hierarchy based thermal design power management method included in the present invention. The implementation of the hierarchy based thermal design power management method 300 according to the present invention preferably includes, but is not limited to, the steps as follows:

Step 301: Boot up.

The electronic device is turned or powered on.

Step 302: User customizes data via BIOS firmware.

Provides for the user to customize data, parameters and configurations by operating the multi-level thermal design power setting page provided by the BIOS firmware.

Step 303: Write user-customized data into embedded controller.

The BIOS firmware is configured to write the user-customized data, parameters and configurations into the embedded controller.

Step 304: Electronic device continues operating.

Step 305: Determine whether to override current temperature level.

The embedded controller is configured to periodically monitor the operating temperature of the processor and to determine whether it is necessary to override the interval temperature upper limit or interval temperature lower limit of the current temperature level. If an override is required (YES), proceed to Step 306; if not (NO), return to Step 304.

Step 306: Embedded controller notifies BIOS firmware.

The embedded controller is configured to send a notification of temperature event to the BIOS firmware.

Step 307: Determine whether to retain current TDP.

The BIOS firmware is configured to determine whether to continue retaining the current TDP for the current temperature level. If retention is required (YES), proceed to Step 308; if not (NO), proceed to Step 309.

Step 308: Record duration of current TDP and retain it.

The current TDP is retained and the current TDP stored in MSR is modified, to avoid frequent TDP switching, and the duration of the current TDP is recorded to serve as a reference for subsequent performance optimization and thermal management. Then return to Step 304.

Step 309: BIOS firmware modifies TDP in model-specific register.

The BIOS firmware is configured to modify the current TDP stored in the model-specific register. Then return to Step 304.

Figure 4:
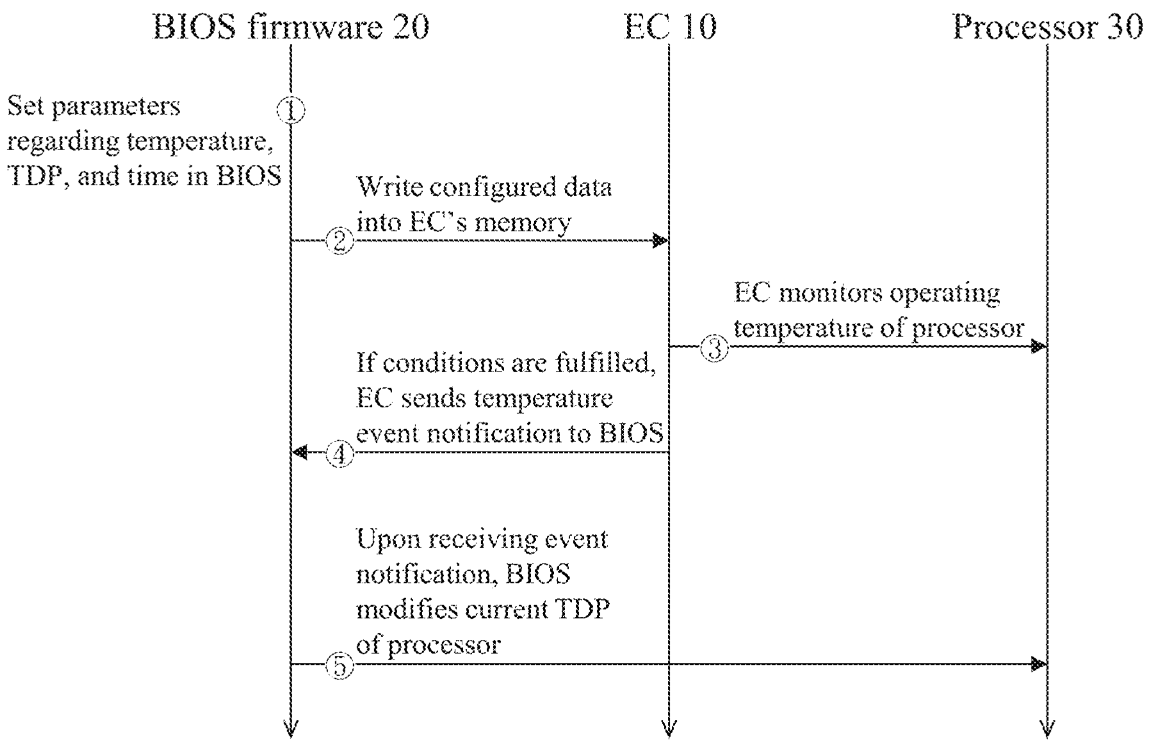
FIG. 4 is a sequence diagram illustrating the execution of the hierarchy based thermal design power management method included in the present invention.

FIG. 4 is a sequence diagram illustrating the execution of the hierarchy based thermal design power management method included in the present invention. The hierarchy based thermal design power management method 300 is executed in sequence along the time line among the embedded controller 10, the BIOS firmware 20, and the processor 30 as follows:

Step ①: Set parameters regarding temperature, TDP, and time in BIOS.

Step ②: Write configured data into EC' memory.

Step ③: EC monitors operating temperature of processor.

Step ④: If conditions are fulfilled, EC sends temperature event notification to BIOS.

Step ⑤: Upon receiving event notification, BIOS modifies current TDP of processor.

Figure 5:
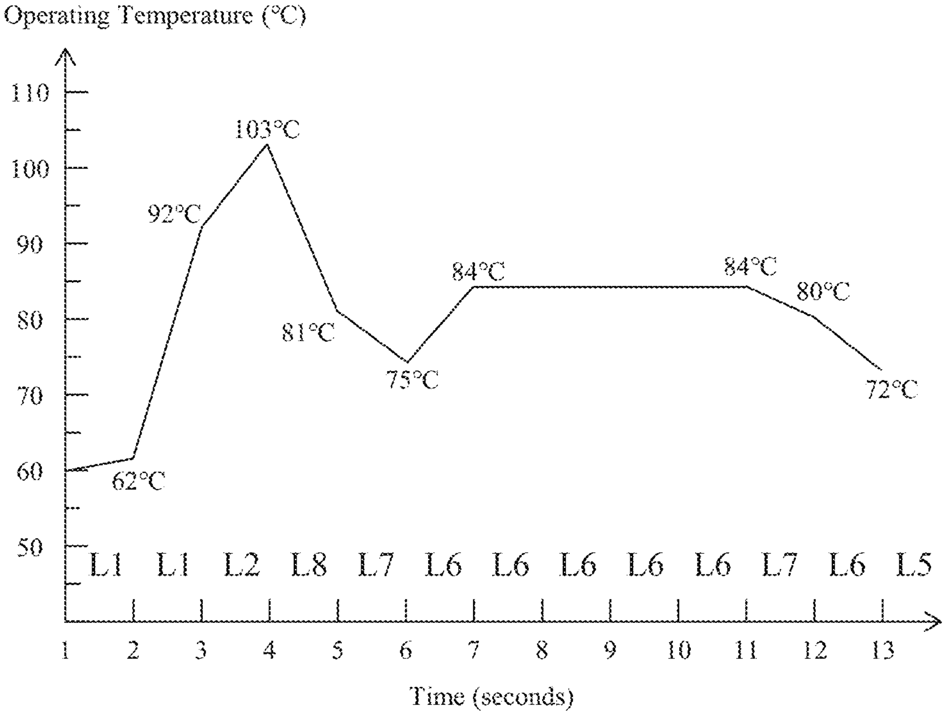
FIG. 5 is a diagram illustrating the temperature changes over time in the second embodiment according to the present invention.
Figure 6:
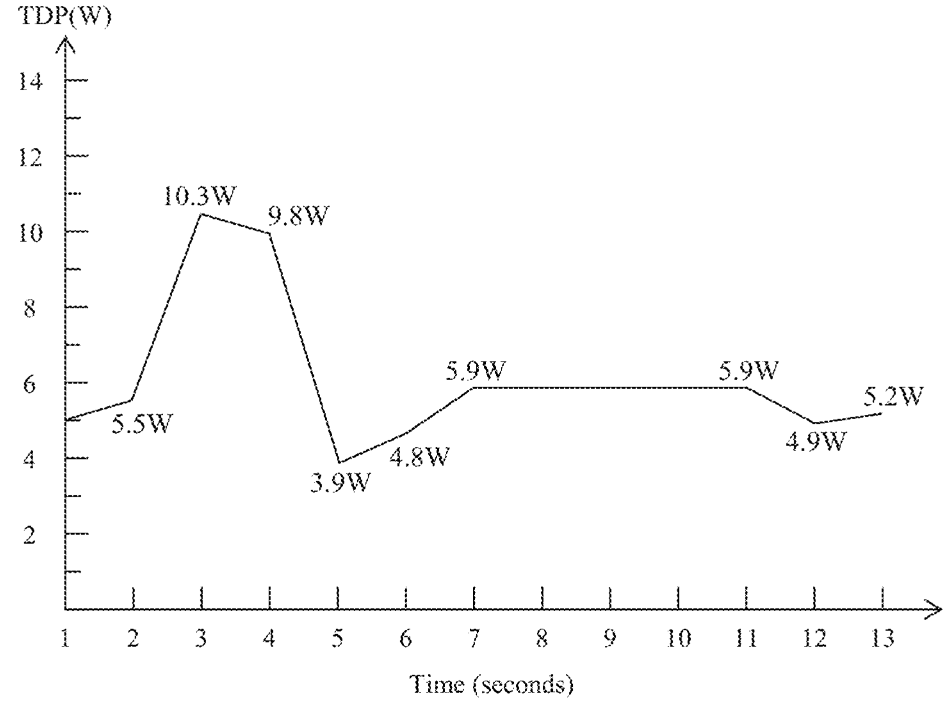
FIG. 6 is a diagram illustrating the thermal design power changes over time in the second embodiment according to the present invention.

FIG. 5 is a diagram illustrating the temperature changes over time in the second embodiment according to the present invention; and FIG. 6 is a diagram illustrating the thermal design power changes over time in the second embodiment according to the present invention. In the second embodiment, at the time from 0 to 7 seconds and from 11 to 13 seconds on the time line, the user-customized data is configured according to the multi-level temperature thermal design power mapping table described in the first embodiment. From 7 to 11 seconds, except that the event delay time is preferably changed to 4 seconds, the user-customized data are all consistent with the multi-level temperature thermal design power mapping table from the first embodiment.

At the time of arrival at the 1st second on the time line, the hierarchy based thermal design power management method according to the present invention begins to execute. At this time, the processor is assumed to be in an idle state. The detected operating temperature of the processor is currently 60° C., and the detected actual TDP is currently 5 W. By performing logical judgements, the EC determines that the current temperature level is the first temperature level L1, and the corresponding TDP limit is 10 W. Next, the EC is configured to send a temperature event notification including the event name, 0xL1, of the first temperature level to the BIOS. After the notification is acknowledged, the BIOS is configured to set the initial value of the current TDP in the MSR with the corresponding TDP limit of 10 W according to the received event name and the saved first temperature event table.

At the time of arrival at the 2nd second, the processor remains in an idle state. The detected operating temperature is currently 62° C., and the detected actual TDP is currently 5.5 W. The EC determines that 62° C. does not exceed the interval temperature upper limit and does not fall below the interval temperature lower limit of the current temperature level L1. Therefore, the current temperature level remains at the first temperature level L1. After the notification is acknowledged, the BIOS is configured to determine that since the current temperature level is not altered, the current TDP is retained and unchanged. Therefore, the BIOS does not make any modification to the current TDP stored in the MSR, to avoid frequent TDP switching.

At the 3rd second, the processor load increases dramatically, causing the operating temperature to rise rapidly up to 92° C. The detected actual TDP is 10.3 W. The EC determines that 92° C. exceeds the interval temperature upper limit of the current temperature level L1. Therefore, the EC logically determines that the higher temperature level, that is, the second temperature level L2, should be assigned as the current temperature level, and notifies the BIOS of the occurrence of the second temperature event, to instruct the BIOS to modify the current TDP limit in the MSR to 9 W. Subject to the configuration, the current TDP limit of the processor is limited to within 9 W starting from the 3rd second. Currently, the actual TDP of 10.3 W already exceeds the current TDP limit of 9 W. At this point of time, the operating temperature of 92° C. also exceeds the predefined critical temperature of 90° C., which is the interval temperature upper limit of the eighth temperature level L8, thus fulfilling the first condition for entering the critical temperature level.

At the 4th second, although the TDP limit is limited to 9 W, the operating temperature of the processor continues to rise up to 103° C. The detected actual TDP decreases slightly to 9.8 W, which is still within the TDP limit of 9 W. However, since the operating temperature has increased by more than 10° C. within a very short time window of 1 second, and reaches 103° C., which approaches the built-in temperature wall limit of 105° C. for the processor, and exceeds the predefined critical up temperature of +10° C., the second condition for entering the critical temperature level is fulfilled. Therefore, the EC logically determines to prioritize assigning the critical temperature level, the eighth temperature level L8, as the current temperature level, and notifies the BIOS of the eighth temperature event. The BIOS then significantly drops the current TDP limit in the MSR to 3 W. Subject to the configuration, the current TDP limit is limited to within 3 W starting from the 4th second to rapidly lower the operating temperature to protect the processor.

At the 5th second, by forcing the TDP limit to be lowered to 3 W, the operating temperature has successfully decreased down to 81° C., and the detected actual TDP also decreases down to 3.9 W. By performing logical judgements, the EC assigns the lower temperature level, the seventh temperature level L7, as the current temperature level and notifies the BIOS of the occurrence of the seventh temperature event, to instruct the BIOS to modify the current TDP limit in the MSR to 4 W.

At the 6th second, under the situation that the current TDP limit is significantly limited, the operating temperature further decreases to 75° C., and the detected actual TDP also decreases to 4.8 W. The EC assigns the lower temperature level, the sixth temperature level L6, as the current temperature level and notifies the BIOS to modify the current TDP limit in the MSR to 5 W.

At the 7th second, the processor load increases again, causing the operating temperature to rise up to 84° C., which exceeds the interval temperature upper limit of the sixth temperature level L6. The detected actual TDP is 5.9 W. The EC assigns the higher temperature level, the seventh temperature level L7, as the current temperature level. However, since the event delay time is set to 4 seconds, the EC is configured to delay notifying the BIOS for 4 seconds. The EC is configured to notify the BIOS until the time comes to the 11th second on the time line.

Between the 7th through 11th seconds, the current temperature level remains at the sixth temperature level L6. At the 11th seconds, the EC is configured to send a notification of temperature event including the event name, 0xL7, of the seventh temperature level L7 to the BIOS. After the notification is acknowledged, the BIOS is configured to override the current TDP limit in the MSR with 4 W corresponding to the seventh temperature level L7, to modify the current TDP limit to 4 W.

At the 12th second, the operating temperature has successfully decreased down to 80° C., and the detected actual TDP is 4.9 W. The EC assigns the lower temperature level, the sixth temperature level L6, as the current temperature level and instructs the BIOS to modify the current TDP limit in the MSR to 5 W.

At the 13th second, as the processor reenters the idle state, the operating temperature decreases to 72° C., and the detected actual TDP is 5.2 W. The EC assigns the lower temperature level, the fifth temperature level L5, as the current temperature level and instructs the BIOS to modify the current TDP limit in the MSR to 6 W.

Figure 7:
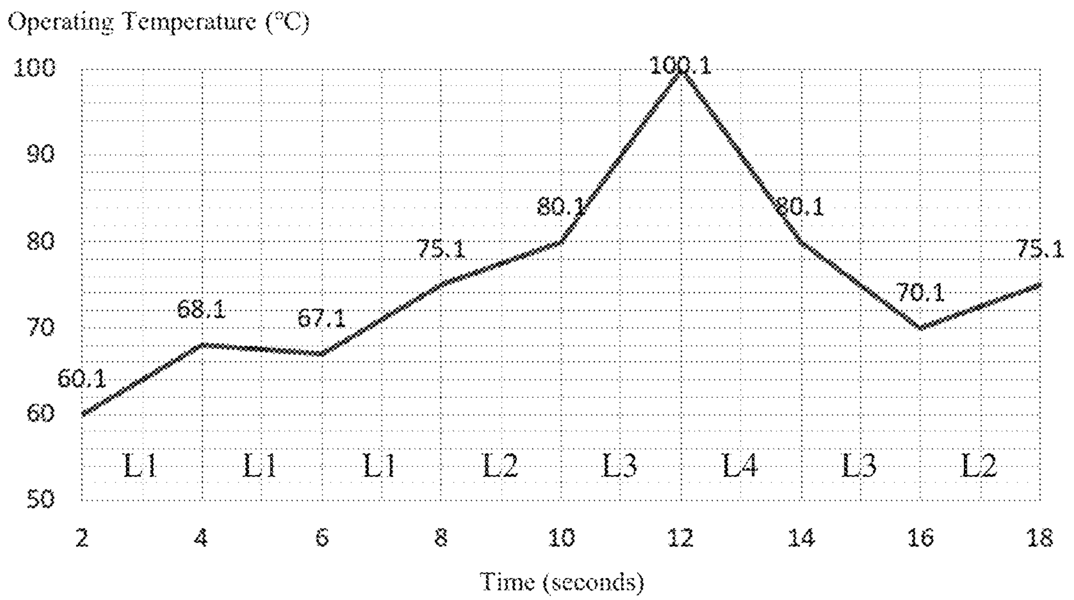
FIG. 7 is a diagram illustrating the temperature changes over time in the third embodiment according to the present invention.
Figure 8:
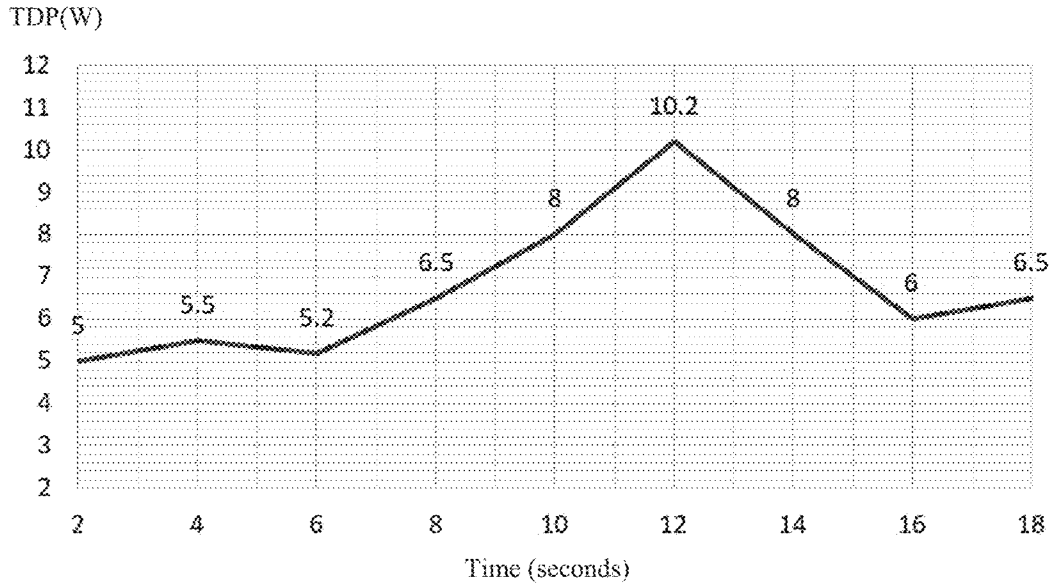
FIG. 8 is a diagram illustrating the thermal design power changes over time in the third embodiment according to the present invention.

FIG. 7 is a diagram illustrating the temperature changes over time in the third embodiment according to the present invention; and FIG. 8 is a diagram illustrating the thermal design power changes over time in the third embodiment according to the present invention. In the third embodiment, the number of temperature levels is preferably set to 6 plus 1 critical temperature level, resulting in a total number of temperature levels n=7. Based on the configuration, the temperature upper limit is preferably set to 100° C., the temperature lower limit to 70° C., the critical temperature to 100° C., the critical up temperature to 5° C., the time window to 2 seconds, the event delay time to 0 seconds, the turbo ratio to 0, and the values of the TDP for the first through seventh temperature levels are preferably set to 12 W, 10 W, 9 W, 8 W, 7 W, 6 W, and 5 W, respectively.

The multi-level temperature thermal design power mapping table for the second embodiment that is established in the BIOS based on the aforementioned user-defined data is as follows:

| Temperature levels (Event names) | Temperature upper limit | Temperature lower limit | TDP limit |
|---|---|---|---|
| First temp. level L1 (0xL1) | 75.000 | 70.000 | 12 |
| Second temp. level L2 (0xL2) | 80.000 | 75.000 | 10 |
| Third temp. level L3 (0xL3) | 85.000 | 80.000 | 9 |
| Fourth temp. level L4 (0xL4) | 90.000 | 85.000 | 8 |
| Fifth temp. level L5 (0xL5) | 95.000 | 90.000 | 7 |
| Sixth temp. level L6 (0xL6) | 100.000 | 95.000 | 6 |
| Seventh temp. level L7 (0xL7) | OT > 100.000 + 5.000 | | 5 |

At the time of arrival at the 2nd second on the time line, the hierarchy based thermal design power management method according to the present invention begins to execute. At this time, the processor is in an idle state, with a detected operating temperature of 60.1° C. and a detected actual TDP of 5 W. By performing logical judgements, the EC assigns the first temperature level L1 as the current temperature level, and the current TDP limit is configured as 12 W. According to the configuration, the actual TDP of 5 W does not exceed the current TDP limit.

At the 4th and 6th seconds, the processor remains in the idle state. The detected operating temperature reaches a maximum of 68.1° C., and the detected actual TDP reaches a maximum of 5.5 W. By performing logical judgements, the EC continues to determine that 68.1° C. does not exceed the interval temperature upper limit or interval temperature lower limit of the current temperature level, and the current temperature level remains at the first temperature level L1. Thus, after the temperature event notifications are acknowledged, the BIOS is configured to retain the current TDP in the MSR, to avoid frequent TDP switching.

At the 8th second, the processor load increases slightly, with a detected operating temperature of 75.1° C. and a detected actual TDP of 6.5 W. The EC determines that 75.1° C. exceeds the interval temperature upper limit of the current temperature level, the first temperature level L1. Therefore, the EC assigns the higher temperature level, the second temperature level L2, as the current temperature level and notifies the BIOS of the occurrence of the second temperature event. The BIOS modifies the current TDP limit in the MSR to 10 W. According to the configuration, the actual TDP of 6.5 W does not exceed the current TDP limit of 10 W.

At the 10th second, the processor load continues to increase, causing the operating temperature to rise to 80.1° C. and the detected actual TDP to reach 8 W. Since 80.1° C. exceeds the interval temperature upper limit of the current temperature level, the second temperature level L2, the current temperature level is stepwisely raised to the third temperature level L3, and the current TDP limit is modified to 9 W. According to the configuration, the actual TDP of 8 W does not exceed the current TDP limit of 9 W.

At the 12th second, the processor load further increases, causing the operating temperature to rise up to 100.1° C. and the detected actual TDP to reach 10.2 W. Since 100.1° C. exceeds the interval temperature upper limit of the third temperature level L3, the current temperature level is stepwisely raised to the fourth temperature level L4, and the current TDP limit is modified to 8 W. According to the configuration, the actual TDP of 10.2 W exceeds the current TDP limit of 8 W. Therefore, starting from the 12th second, the current TDP is limited to within 8 W.

At the 14th second, since the TDP limit is limited to 8 W, the actual TDP gradually decreases to 8 W, and the operating temperature has also successfully decreased accordingly. The operating temperature of the processor drops to 80.1° C., and the detected actual TDP is 8 W. Since 80.1° C. falls below the interval temperature lower limit of the fourth temperature level L4, the current temperature level is stepwisely lowered to the third temperature level L3, and the current TDP limit is modified to 9 W. According to the configuration, the actual TDP of 8 W does not exceed the current TDP limit of 9 W.

At the 16th second, as the processor load decreases, the operating temperature of the processor further decreases to 70.1° C., and the detected actual TDP is 6 W. Since 70.1° C. is below the interval temperature lower limit of the third temperature level L3, the current temperature level is further stepwisely lowered to the second temperature level L2, and the TDP limit is modified to 10 W. According to the configuration, the actual TDP of 6 W does not exceed the current TDP limit of 10 W.

At the 18th second, the processor load increases slightly, causing the operating temperature to rise to 75.1° C., and the detected actual TDP to reach 6.5 W. Since 75.1° C. does not exceed the interval temperature upper limit and does not fall below the interval temperature lower limit of the second temperature level L2, the current temperature level remains at the second temperature level L2, and the current TDP limit remains 10 W. According to the configuration, the actual TDP of 6.5 W does not exceed 10 W.

The hierarchy based TDP configuration provided by the present invention is focused to achieve the purpose of cooling the processor while maintaining relatively good performance. By with reference to the stochastic variations of operating temperature, the present invention is capable of dynamically adjusting the TDP limit to maximize the performance for the electronic device. The present invention is particularly suitable for electronic devices that prioritize thermal balance, such as, but not limited to, desktop computers, laptop computers, POS systems, SCO systems, and other electronic devices focused on maintaining relatively good performance while performing thermal management. It is also highly applicable to electronic devices made of deteriorated heat dissipation materials.

In particular, modern desktop and laptop computers are required to maintain compact sizes, but the performances thereof are not allowed to significantly degrade. Therefore, it is important to achieve a balance between TDP and thermal management. The present invention is particularly suitable for managing temperature and TDP with a balanced configuration.

There are further embodiments provided as follows.

Embodiment 1: A hierarchy based thermal design power management method, includes: through a BIOS firmware: providing for a user to customize a plurality of temperature levels including a current temperature level defined by an interval temperature upper limit and an interval temperature lower limit; through an embedded controller: periodically reading an operating temperature for a processor; assigning a higher temperature level as the current temperature level, if the operating temperature is greater than the interval temperature upper limit; and assigning a lower temperature level as the current temperature level, if the operating temperature is less than the interval temperature lower limit.

Embodiment 2: The hierarchy based thermal design power management method as described in Embodiment 1, further includes: at the embedded controller: setting a time length of a time window as a monitoring period and periodically reading the operating temperature accordingly; sending a temperature event notification including the current temperature level to the BIOS firmware; through the BIOS firmware: providing for a user to customize the plurality of temperature levels and a thermal design power corresponding to each of the plurality of temperature levels, respectively, wherein the plurality of temperature levels includes the higher temperature level, the current temperature level and the lower temperature level; determining the thermal design power corresponding to the received current temperature level according to the received current temperature level; and overriding a current thermal design power stored in a model-specific register of the processor with the determined thermal design power.

Embodiment 3: The hierarchy based thermal design power management method as described in Embodiment 2, further includes a critical control mode, wherein the critical control mode includes: through the embedded controller: assigning a critical temperature level as the current temperature level, wherein the critical temperature level is corresponded to a critical thermal design power, if the operating temperature is greater than a critical temperature at a starting of the time window, and greater than a critical up temperature at an end of the time window.

Embodiment 4: The hierarchy based thermal design power management method as described in Embodiment 3, further includes a turbo control mode, wherein the turbo control mode includes: through the BIOS firmware: providing for a user to customize an enablement of an always-on turbo submode, an enablement of a critical turbo submode, and a turbo ratio; after enabled, the always-on turbo submode being configured to assign a clock for the processor according to the turbo ratio; and after enabled, the critical turbo submode configured to assign a clock for the processor according to the turbo ratio only when the current temperature level is the critical temperature level.

Embodiment 5: The hierarchy based thermal design power management method as described in Embodiment 1, further includes an advanced control mode, wherein the advanced control mode includes: through the BIOS firmware: providing for a user to customize an event delay time; and through the embedded controller: assigning the higher temperature level as the current temperature level, if the operating temperature is greater than the interval temperature upper limit; assigning the lower temperature level as the current temperature level, if the operating temperature is less than the interval temperature lower limit; and after the event delay time is elapsed, sending the temperature event notification including the current temperature level to the BIOS firmware.

Embodiment 6: The hierarchy based thermal design power management method as described in Embodiment 1, further includes: writing data customized through the BIOS firmware into the embedded controller; and establishing a multi-level temperature thermal design power mapping table and writing it into the embedded controller.

Embodiment 7: A hierarchy based thermal design power management module, includes: a processor including a temperature sensor and a model-specific register; a BIOS firmware configured to provide for a user to customize a plurality of temperature levels including a current temperature level defined by an interval temperature upper limit and an interval temperature lower limit; and an embedded controller configured to: periodically read an operating temperature sensed by the temperature sensor; override the current temperature level with a higher temperature level, if the operating temperature is greater than the interval temperature upper limit; and override the current temperature level with a lower temperature level, if the operating temperature is less than the interval temperature lower limit.

Embodiment 8: The hierarchy based thermal design power management module as described in Embodiment 7, further includes: the embedded controller configured to: set a time length of a time window as a monitoring period and periodically read the operating temperature accordingly; and send a temperature event notification including the current temperature level to the BIOS firmware; and the BIOS firmware configured to: provide for a user to customize the plurality of temperature levels and a thermal design power corresponding to each of the plurality of temperature levels, respectively, wherein the plurality of temperature levels includes the higher temperature level, the current temperature level and the lower temperature level; determine the thermal design power corresponding to the current temperature level according to the current temperature level; determine whether to retain a current thermal design power; override the current thermal design power stored in the model-specific register with the determined thermal design power, if it is determined not to retain the current thermal design power; and retain the current thermal design power stored in the model-specific register and recording a duration of the current thermal design power, if it is determined to retain the current thermal design power.

Embodiment 9: An electronic device, includes: a processor including a temperature sensor and a model-specific register; a BIOS firmware configured to provide for a user to customize a plurality of temperature levels including a current temperature level defined by an interval temperature upper limit and an interval temperature lower limit; and an embedded controller configured to: periodically read an operating temperature sensed by the temperature sensor; override the current temperature level with a higher temperature level, if the operating temperature is greater than the interval temperature upper limit; and override the current temperature level with a lower temperature level, if the operating temperature is less than the interval temperature lower limit.

Embodiment 10: The electronic device as described in Embodiment 7, further includes: the embedded controller configured to: set a time length of a time window as a monitoring period and periodically read the operating temperature accordingly; and send a temperature event notification including the current temperature level to the BIOS firmware; and the BIOS firmware configured to: provide for a user to customize the plurality of temperature levels and a thermal design power corresponding to each of the plurality of temperature levels, respectively, wherein the plurality of temperature levels includes the higher temperature level, the current temperature level and the lower temperature level; determine the thermal design power corresponding to the current temperature level according to the current temperature level; determine whether to retain a current thermal design power; override the current thermal design power stored in the model-specific register with the determined thermal design power, if it is determined not to retain the current thermal design power; and retain the current thermal design power stored in the model-specific register and recording a duration of the current thermal design power, if it is determined to retain the current thermal design power.

While the disclosure has been described in terms of what are presently considered to be the most practical and preferred embodiments, it is to be understood that the disclosure need not be limited to the disclosed embodiments. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present disclosure which is defined by the appended claims.

What is claimed is:

1. A hierarchy based thermal design power management method, comprising:

through a BIOS firmware:

providing for a user to customize a plurality of temperature levels comprising a higher temperature level, a lower temperature level, and a current temperature level defined by an interval temperature upper limit and an interval temperature lower limit and a thermal design power corresponding to each of the plurality of temperature levels, respectively;

through an embedded controller:

setting a time length of a time window as a monitoring period;

periodically reading an operating temperature for a processor based on the time length;

assigning the higher temperature level as the current temperature level, if the operating temperature is greater than the interval temperature upper limit;

assigning the lower temperature level as the current temperature level, if the operating temperature is less than the interval temperature lower limit;

sending a temperature event notification comprising the current temperature level to the BIOS firmware; and through the BIOS firmware:

determining the thermal design power corresponding to the received current temperature level according to the received current temperature level; and overriding a current thermal design power stored in a model-specific register of the processor with the determined thermal design power.

2. The hierarchy based thermal design power management method as claimed in claim 1, further comprising a critical control mode, wherein the critical control mode comprises:

through the embedded controller:

assigning a critical temperature level as the current temperature level, wherein the critical temperature level is corresponded to a critical thermal design power, if the operating temperature is greater than a critical temperature at a starting of the time window, and greater than a critical up temperature at an end of the time window.

3. The hierarchy based thermal design power management method as claimed in claim 2, further comprising a turbo control mode, wherein the turbo control mode comprises:

through the BIOS firmware:

providing for a user to customize an enablement of an always-on turbo submode, an enablement of a critical turbo submode, and a turbo ratio;

after enabled, the always-on turbo submode being configured to assign a clock for the processor according to the turbo ratio; and after enabled, the critical turbo submode configured to assign a clock for the processor according to the turbo ratio only when the current temperature level is the critical temperature level.

4. The hierarchy based thermal design power management method as claimed in claim 1, further comprising an advanced control mode, wherein the advanced control mode comprises:

through the BIOS firmware:

providing for a user to customize an event delay time; and through the embedded controller:

assigning the higher temperature level as the current temperature level, if the operating temperature is greater than the interval temperature upper limit;

assigning the lower temperature level as the current temperature level, if the operating temperature is less than the interval temperature lower limit; and after the event delay time is elapsed, sending the temperature event notification including the current temperature level to the BIOS firmware.

5. The hierarchy based thermal design power management method as claimed in claim 1, further comprising:

writing data customized through the BIOS firmware into the embedded controller; and establishing a multi-level temperature thermal design power mapping table and writing it into the embedded controller.

6. A hierarchy based thermal design power management module, comprising:

a processor comprising a temperature sensor and a model-specific register;

a BIOS firmware configured to provide for a user to customize a plurality of temperature levels comprising a higher temperature level, a lower temperature level, and a current temperature level defined by an interval temperature upper limit and an interval temperature lower limit and a thermal design power corresponding to each of the plurality of temperature levels, respectively;

an embedded controller configured to:

set a time length of a time window as a monitoring period;

periodically read an operating temperature sensed by the temperature sensor based on the time length;

assign the higher temperature level as the current temperature level, if the operating temperature is greater than the interval temperature upper limit;

assign the lower temperature level as the current temperature level, if the operating temperature is less than the interval temperature lower limit; and send a temperature event notification comprising the current temperature level to the BIOS firmware; and the BIOS firmware configured to:

determine the thermal design power corresponding to the received current temperature level according to the received current temperature level; and override a current thermal design power stored in the model-specific register of the processor with the determined thermal design power.

7. An electronic device, comprising:

a processor comprising a temperature sensor and a model-specific register;

a BIOS firmware configured to provide for a user to customize a plurality of temperature levels comprising a higher temperature level, a lower temperature level, and a current temperature level defined by an interval temperature upper limit and an interval temperature lower limit and a thermal design power corresponding to each of the plurality of temperature levels, respectively; and an embedded controller configured to:

set a time length of a time window as a monitoring period;

periodically read an operating temperature sensed by the temperature sensor based on the time length;

assign the higher temperature level as the current temperature level, if the operating temperature is greater than the interval temperature upper limit;

assign the lower temperature level as the current temperature level, if the operating temperature is less than the interval temperature lower limit; and send a temperature event notification comprising the current temperature level to the BIOS firmware; and the BIOS firmware configured to:

determine the thermal design power corresponding to the received current temperature level according to the received current temperature level; and override a current thermal design power stored in the model-specific register of the processor with the determined thermal design power.

* * * * *